Jan. 16, 1951 G. L. WING SHEE ET AL 2,538,719
AIRCRAFT TOW TARGET CARRIER
Filed Dec. 4, 1947 6 Sheets-Sheet 1

George L. Wing Shee &
Morton I. Weinberg
INVENTOR.

BY

THEIR PATENT ATTORNEY

Jan. 16, 1951  G. L. WING SHEE ET AL  2,538,719
AIRCRAFT TOW TARGET CARRIER
Filed Dec. 4, 1947  6 Sheets-Sheet 2
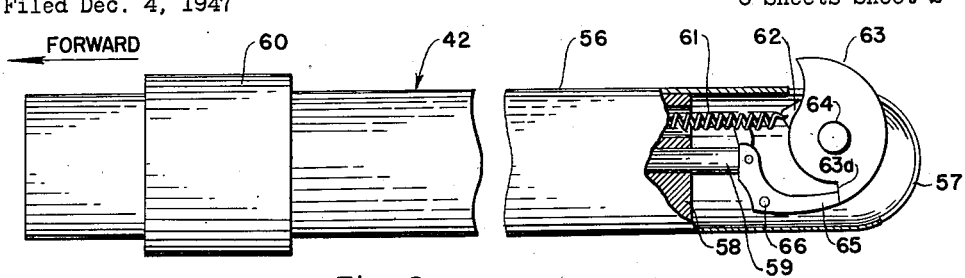
Fig. 6
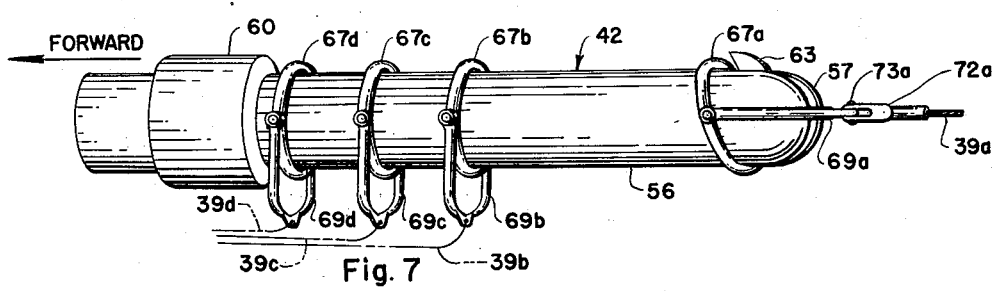
Fig. 7
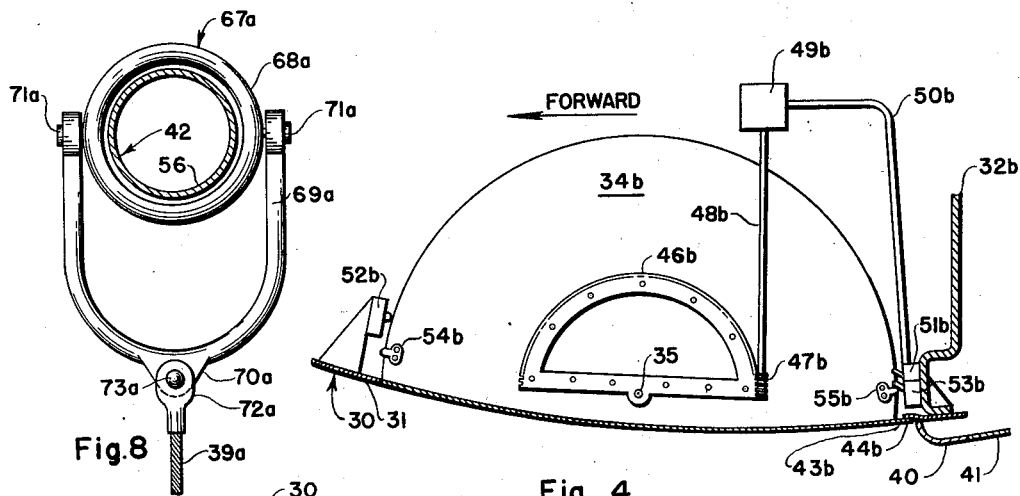
Fig. 8
Fig. 4
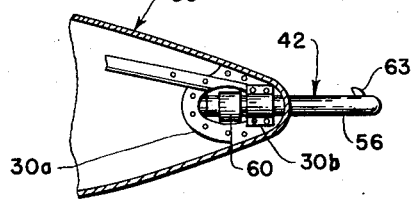
Fig. 5
George L. Wing Shee &
Morton I. Weinberg
*INVENTOR.*
BY
THEIR PATENT ATTORNEY

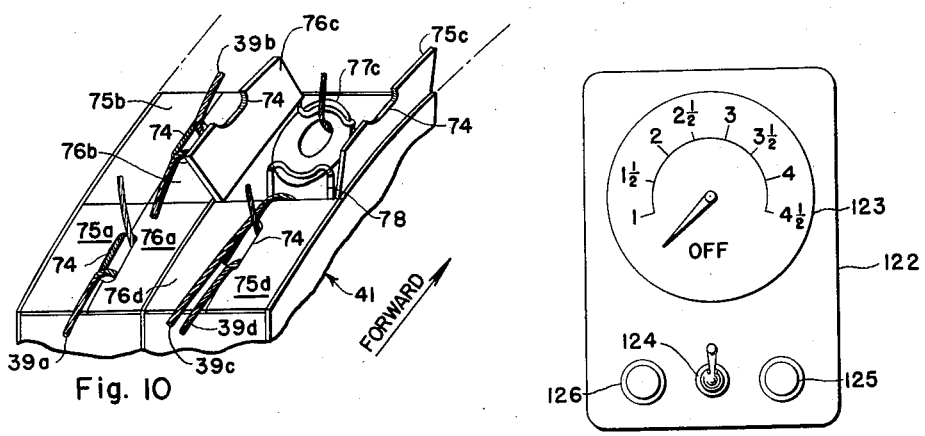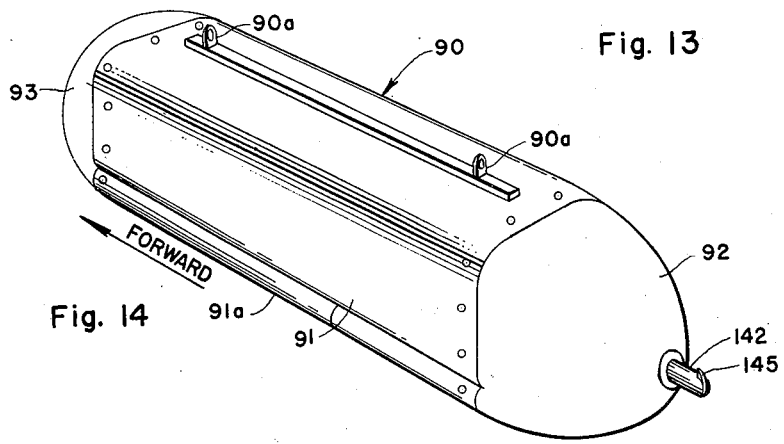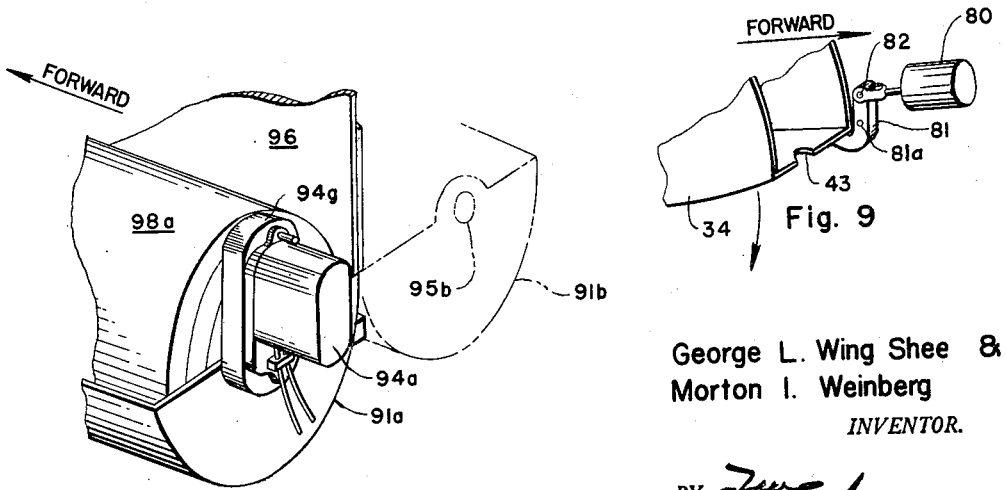

George L. Wing Shee &
Morton I. Weinberg
*INVENTOR.*

BY

THEIR PATENT ATTORNEY

Jan. 16, 1951     G. L. WING SHEE ET AL     2,538,719
AIRCRAFT TOW TARGET CARRIER

Filed Dec. 4, 1947     6 Sheets–Sheet 5

George L. Wing Shee &
Morton I. Weinberg
*INVENTOR.*

BY

THEIR PATENT ATTORNEY

George L. Wing Shee &
Morton I. Weinberg
*INVENTOR.*

THEIR PATENT ATTORNEY

Patented Jan. 16, 1951

2,538,719

UNITED STATES PATENT OFFICE 2,538,719

AIRCRAFT TOW TARGET CARRIER

George L. Wing Shee, Houston, Tex., and Morton I. Weinberg, Ypsilanti, Mich., assignors to Curtiss-Wright Corporation, a corporation of Delaware Application December 4, 1947, Serial No. 789,710

26 Claims. (Cl. 244—1)

This invention relates generally to externally carried accessories for aircraft and other vehicles, and more particularly to improvements in tow target carrier systems and their component parts.

In order to provide gunnery training, both for ground and aerial gun crews, similar to that which is encountered in actual combat, it has been customary to tow a target aloft from a towing airplane for gunners to fire upon in simulation of such actual combat. These targets are generally towed by fast fighter or pursuit type aircraft, referred to at times as "towing" or "tug" aircraft, in order to create conditions similar to those met with in actual aerial combat. In the past the targets have had to be towed aloft from the ground by means of a relatively long cable because sufficient slack had to be provided to permit the airplane to attain flying speed before the tow target was moved off the ground. This long cable has been, however, a potential hazard in that it frequently became fouled with ground objects and occasionally airplanes had been severely damaged as a result. These prior operations were usually costly in that after a tow target had been riddled as a result of practice firing, it became necessary for the towing airplane to land again to obtain another tow target. A still further difficulty has been the problem of obtaining adequate clearance between the tow target cable and the airplane empennage, or other of its components, inasmuch as prior tow targets have generally been attached to the external bomb shackle, and the exceedingly long cable usually allowed more freedom of movement of the tow target which increased the possibility of fouling with the airplane and its parts.

It is accordingly a major object of the present invention to provide a container for a tow target which will permit the towing airplane to take off with the target in an inoperative, or closely hauled condition, until the desired altitude has been reached; and then to provide for the release of the selected tow target to an operative position from which it may subsequently be jettisoned from the airplane after it is riddled by practice gunfire. It is a further object to provide an external multiple tow target carrier which can be readily installed upon the existing bomb shackles and equipment of an airplane, or other suitable towing means.

It is a further object of the present invention to provide a tow target installation in which the target attaching point is more remote from the axis or thrust line of the aircraft than heretofore to thereby increase and improve the clearance in order to prevent fouling. A further object is to provide a tow target installation housing multiple targets in an inoperative or retracted position in order to preclude the necessity of landing the airplane each time that a target has been riddled. It is a still further object of the invention to provide a tow target carrier which may be quickly and easily installed, removed or jettisoned from a pursuit or other suitable towing airplane, thus providing for gunnery practice at a forward base of military operations, where the prior conventional type towing aircraft might not always be readily available.

Other objects and advantages of the present invention will occur to those skilled in the art upon reading the following description taken in conjunction with the accompanying drawings forming a part hereof, in which:

Figure 4 is a sectional elevational view of the tow target storage bin portion of the target container shown in the previous figures;

Figure 5 is a sectional elevational view showing the structural attachment of the target towing and release latch mechanism at the rear end of the container;

Figure 6 is an enlarged view of the towing and release latch mechanism of Figure 5, partly broken away;

Figure 7 is a perspective view of the same with several target attaching rings mounted thereon;

Figure 8 is a detail view of one of the target attaching rings on the tubular housing of the release mechanism;

Figure 9 is a perspective view of a modified form of bin release mechanism utilizing an operating solenoid for use where the tow target compartments are spring-biased;

Figure 10 is a perspective view of the bottom of the cord coil installation in an inverted position utilizing multiple doors;

Figure 13 is an elevational view of an indicating and control panel for the electrical equipment for such tow target systems;

Figure 14 is a perspective view of the modified form of tubular multiple tow target container for flag type targets;

Figure 15 is a similar perspective view of an end of the same container showing the door actuating means;

Figure 1:
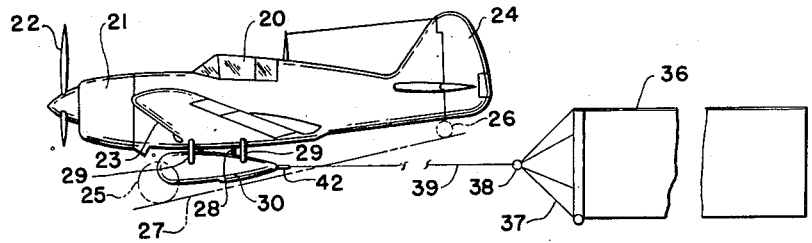
Figure 1 is a side elevational view of an airplane showing a form of the present tow target improvement installed thereon.

Referring now to Figure 1, there is shown a fighter or pursuit type airplane 20 having a conventional power plant 21, tractor propeller 22, wings 23 and an empennage 24. The airplane may also be provided with a conventional landing gear comprising the main wheels 25 and the tail wheel 26 adapted to support the craft upon the ground in an attitude indicated by the ground line 27. The airplane 20 is provided with conventional external bomb shackles 28 and sway braces 29 which are quickly and detachably engaged by the streamlined multiple tow target container 30. Towed from the trailing portion of the streamlined container 30 is a sleeve type tow target 36 attached by means of tapes or lines 37 to a connector ring 38, which is in turn attached to the streamlined container 30 by means of the towing cord or cable 39. It will be noted that the axis of the tow target cable, or cord 39, is disposed considerably below the longitudinal axis or thrust line of the airplane and permits of maximum clearance beneath the fuselage and the tail wheel 26. At the same time, however, the container adequately clears the ground line 27 in the compacted or the loaded condition of the landing gear.

Figure 2:
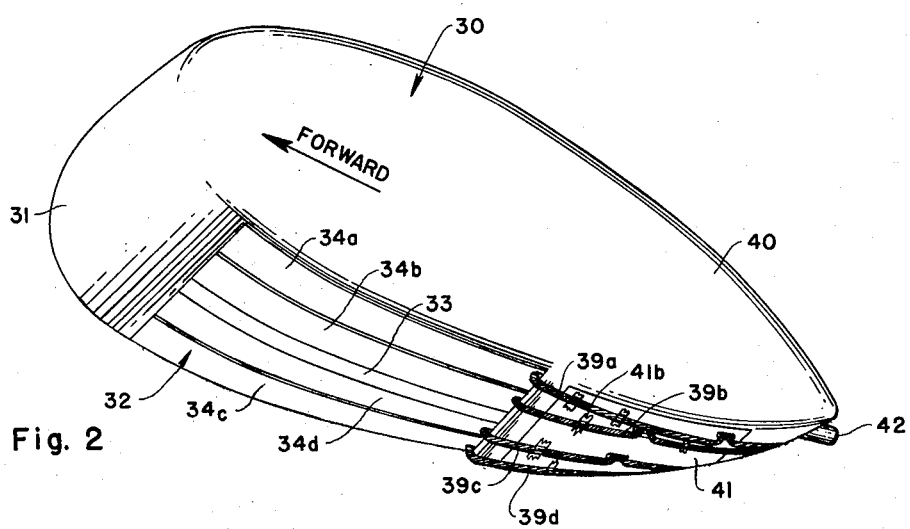
Figure 2 is a perspective view looking from beneath a streamlined multiple tow target container for use with sleeve type targets.
Figure 3:
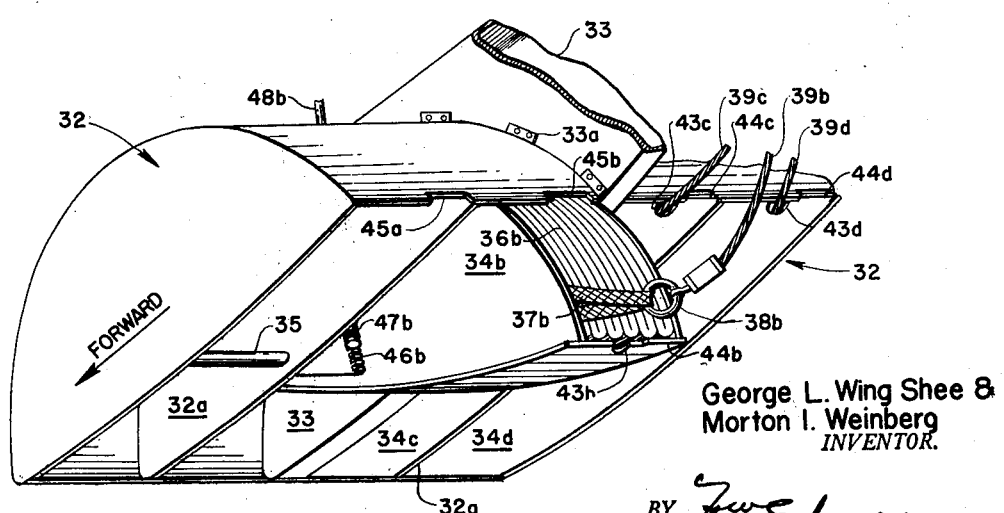
Figure 3 is a bottom perspective view of the target storage bin portion of the tow target container shown in Figure 2.

Referring now to Figures 2 to 8 inclusive, and more particularly to Figure 2, the streamlined container 30 is provided with a rounded nose portion 31 and a tiltable bin or storage portion 32, within which a plurality of sleeve type tow targets are adapted to be stored or housed in their folded condition. The multiple bin 32 is preferably symmetrically supported from each side by a central fore and aft beam or spar member 33, being attached thereto by the clips or fittings 33a as shown in Figure 3 on each side of the central beam. The bin compartment assembly 32 is divided into four laterally disposed sections within which the tiltable bins 34a, 34b, 34c and 34d are adapted to be selectively rotated or tilted about the transverse horizontal pivot 35. The aft portion of the streamlined container 30 reduces or tapers appreciably in cross-section toward the trailing portion 40, within which is housed the cord or cable compartment 41, and which terminates at its rearward end with the towing and release mechanism 42.

Referring now to Figure 4, the second bin compartment 34b is rotatably driven by a reversible electric motor 49b driving the shaft 48b and the worm 47b which engages the worm gear segment 46b fixedly attached to the side of the bin 34b. The bottom of each bin is outwardly curved to form a streamlined continuation of the main body portion of the container 30 and each bin has a rearwardly extending lip portion, such as 44b, adapted to engage an offset seat portion in the undersurface of the cable compartment 41. The lip portion 44b has a recess or open slot 43b which cooperates with a slot 45b within the bin portion 32 to permit the tapes 37b, connector ring 38b, and the cable 39b to extend from the stored and folded target 36b, outwardly and rearwardly to the cable compartment 41b. To the fixed portions of the container 30 and the wall 32b, there are fixedly mounted limit switches 52b and 53b, adjacent the front and rear edges of the bin 34b, which switches are adapted to be actuated by the extending detents 54b and 55b respectively. A further limit switch 51b is also mounted upon the wall 32b, remaining closed until opened by the detent 54b when the bin 34b is fully opened. These three switches are adapted to condition the portions of the circuit shown in Figure 12 controlling the operation of the motor 49b through the electric cable 50b.

The tilting and retraction of the individual bins, for which the foregoing description of bin 34b is typical, will be described below in greater detail and it will be sufficient to explain at this point that as soon as a bin, such as 34b is tilted or dumped the weight of the folded sleeve target 36b will cause the same to be dropped into the airstream by which it is carried rearwardly beneath the aircraft. It is, however, retained by the respective cable 39b which tears away the temporary coil clips 41b in such manner that the cord or cable is unwound from the spool within the cord housing compartment 41 until the rear portion attached to the release mechanism 42 at the trailing end of the container 30 is reached, and by which it is retained and towed until it is desired to jettison this particular target.

The target attachment and release mechanism 42 is more fully shown in Figures 5 to 8 inclusive, being retained within the container 30 by the trailing portion fitting 30a to which it is clamped by means of the split clamp fitting 30b, as more particularly shown in Figure 5. The release mechanism assembly 42 comprises a main cylindrical body or housing 56 which is cut across diametrically to provide a slot 57 at its aft portion as shown in Figures 6 and 7. Within the body 56 there is provided an internal block or guide 58 which is suitably apertured for the movement of the plunger 59 in an axial direction therethrough, the plunger being subject to actuation by an electric solenoid 60 adjacent the forward portion of the release mechanism assembly. A tension spring 61, anchored at its forward end resiliently biases the trip 63 to which the spring is attached by the apertured ear or lug 62. The trip 63 has a hook portion which extends outwardly through the slot 57 beyond the semispherical portion of the housing 56 on which it is pivotally mounted by a transverse pin 64. The latch hook or trip 63 has a detent portion 63a which is engaged and held in its locked or latched position by the dog 65, pivotally mounted upon the housing 56 by the pivot pin 66.

It will be apparent that the hook or trip 63 is readily released from its latched position as shown in Figure 6 by actuation of the solenoid 60 and rearward movement of the plunger 59 causing clockwise rotation of the dog 65 beyond the detent portion 63a of the trip which permits the latter to be rotated in a clockwise direction by the rearward pull of the tow target, overcoming the tension of the spring 61. The individual tow targets are retained upon the release mechanism 42 by means of the several ring adaptors 67a, 67b, 67c and 67d, as shown in Figure 7. A typical ring adaptor assembly is shown in detail in Figure 8 in which the assembly 67a comprises a main ring or annulus 68a of an inside diameter such that it is free to slide along the cylindrical body portion 56. The ring 68a has pivotally attached to it the U-shaped arm or bridle 69a by means of the trunnion-forming pins 71a extending diametrically outwardly at each side of the ring 68a.

At the outer or free end of the bridle 69a it is provided with an apertured lug or ear 70a to which a clevis 72a and a clevis pin 73a serve to connect the respective cable or cord 39a.

Figure 11:
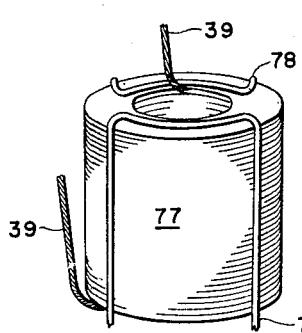
Figure 11 is a view of one of the cord coils with spring-clip retainers for maintaining the cord coils in the compartments.

Referring now to Figures 10 and 11, there is shown, respectively, in their inverted positions, the cable or cord coil compartment 41 aft of the target bin compartment 32 and a detailed view of one of the cord coils 77 with its spring clip or retaining the same in its compartment. Each of the four coil compartments is provided across its bottom opening with doors 75a and 76a; 75b and 76b; 75c and 76c; and 75d and 76d such as for the coil 77a to which the cord 39a is connected. These doors are of the double hinged type, meeting along the center lines of the compartments and are recessed to provide a central opening 74 through which the cord from the coil to the target and from the coil to the release mechanism are permitted to pass. The coiled cord or spool assemblies 77 are maintained in their cylindrical shape by dipping in a suitable plastic or wax and are held in their suspended positions within each compartment by means of the spring clips 78 which are snapped off by the unwinding action of the cord as the target is dropped into the airstream and is carried rearwardly thereby.

While the operating arrangement for the target bin shown in Figures 3 and 4 has been shown in these figures, the detailed actuation of which will be hereinafter more fully described, the bins may alternatively be more simply actuated by the mechanism shown in Figure 9. In this arrangement each of the bins (such as 34 in this figure), is biased as by a suitable coil spring (not shown) which is sufficient to cause the loaded bin, with the aid of the airstream to which it is exposed, to be rotated to its unloading position. The bin 34, loaded with its target, is releasable by actuation of the solenoid 80 at the forward end of the bin by means of a simple push-button or other switch in the pilot's compartment. Actuation of the solenoid 80 causes the plunger to move forwardly, and being pivotally connected at 82 to the latch arm 81, in turn pivotally movable about the pivot 81a, it causes the lower, rearwardly extending detent portion of the latch 81 to be retracted forwardly from engagement with the bottom of the bin adjacent the slot 43, and accordingly permits rotation of the bin 34 under the influence of the torsion spring to drop the folded target, the bin continuing its rotation through 360 degrees to its starting position.

Figure 12:
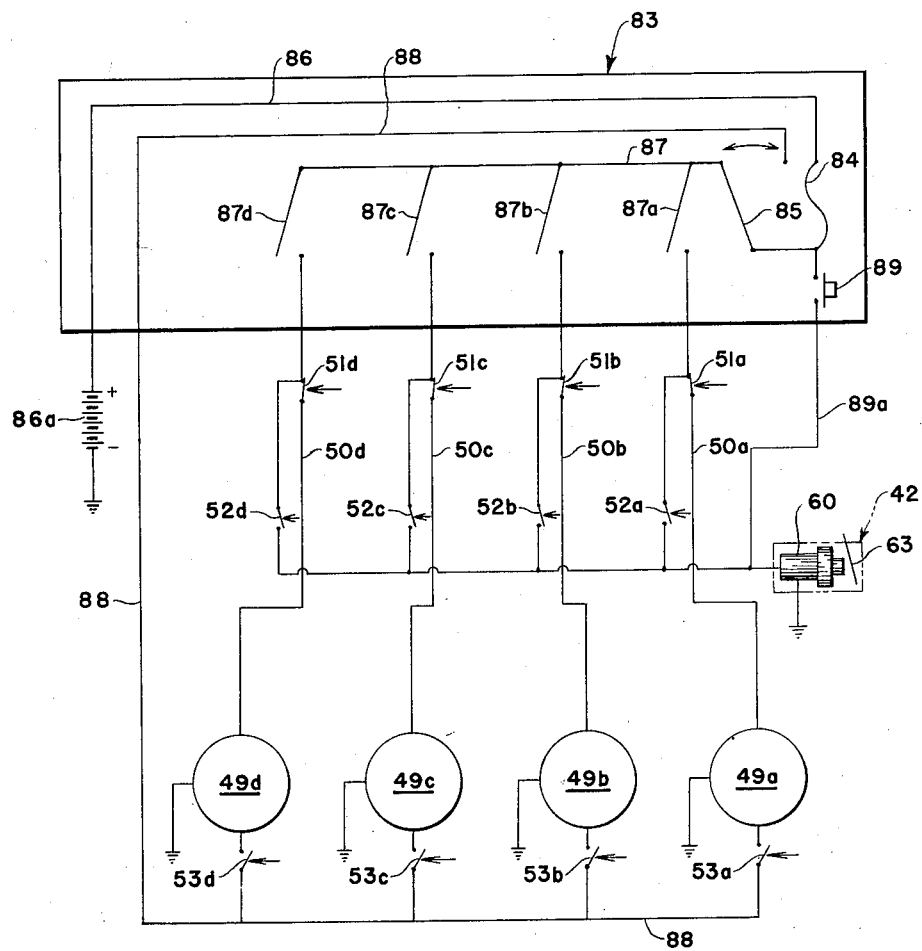
Figure 12 is a wiring diagram of the electrical circuits for the operation of the sleeve type tow target system shown in the preceding figures.

By reference to the wiring diagram in Figure 12, the operation of the bin type tow target container, shown and described in conjunction with the previous figures, will be explained. A master switch box 83 is located in the cockpit convenient to the pilot position and has disposed therein a master three-position switch 85 controlling the energy from the battery or other power source 86a through the power line 86, being protected by the fuse 84. The master switch 85 is movable from the position shown in Figure 12 (in which it closes the circuit to the compartment selection switch bank 87), through its intermediate open position to the opposite position to the right in which it supplies current to the motor-reversing, or door-closing circuit 88. A bank of compartment selection switches 87a, 87b, 87c and 87d are selectively connectable, upon being closed, to the respective lines 50a, 50b, 50c and 50d, thereby closing the circuits to the corresponding door actuating motors 49a, 49b, 49c, and 49d. It will be recalled that the limit switches 51a, 51b, 51c and 51d are disposed in the respective lines running to the designated actuating motors, and as shown in Figure 4, these switches are located at the aft ends of the respective bins, 34a, 34b, 34c and 34d. The limit switch 51a, as well as the others corresponding thereto, are each in the closed position in the closed condition of the respective bin compartments, these limit switches being manually closed when the targets are loaded into the respective bins.

The switches 52a, 52b, 52c and 52d, located at the forward end of the respective bin compartments, are disposed in branch circuits which are each respectively connected to the power side of the limit switches 51a, 51b, 51c and 51d, and upon being closed energize the solenoid 60 which trips the release mechanism 63 at the aft end of the target container for the jettisoning of the previously used target. Limit switches 53a, 53b, 53c and 53d are disposed between the motor reversing or door-closing line 88 and the terminals to the respective motors 49a, 49b, 49c and 49d. These latter limit switches are also disposed at the aft ends of the respective bins adjacent the above mentioned limit switches 51a, 51b, 51c and 51d, but unlike the latter, the switches in the 52a group are "open" in the closed position of the respective bin compartment.

The operation of the bin type multiple target container 30 is as follows: Let us assume that the target container 30 has each of its compartments loaded with a folded sleeve type target, which targets have their towing cords or cables extending from the target compartment 32, into the coil compartment 41, being temporarily taped to the bottom of the container by the straps or clips 41b as shown in Figure 2. The airplane, accordingly, can take-off from the ground or other runway with the targets completely stowed within the streamlined container without the danger of trailing cables or targets until the airplane reaches the desired altitude and position where the targets are desired to be put into use. In this take-off condition, the master switch 85 has been kept in its "open" or "off" position and the limit switches 52a etc. and 53a etc. or similarly in their "open" or "off" positions, the limit switch group 51a etc. are however, each in their "closed" position, having been closed as the respective bins were loaded and returned to their closed positions. Prior to the initial use of the units each of the compartment selection switches 87a, 87b, 87c and 87d are also in their "open" position, as shown in Figure 12.

In order to drop or release the first target 36a into its towed position, the switch 85 is moved into the position in which it supplies current to the switch bank line 87, following which the selector switch 87a is closed. This serves to energize the motor 49a through the line 50a and the closed limit switches 51a, and the motor through its drive shaft 48 and the worm drive 46—47 imparts clockwise rotation, (as viewed in Figure 4) to the bin compartment. Shortly after the rotation of the bin has started, the detent 54 momentarily engages the contactor of the switch 52a and the solenoid 60 is energized, thereby tripping the latch 63 and insuring that the previously used target is jettisoned or dispensed with. Normally, the limit switch 52a to the first compartment can be dispensed with, inasmuch as the targets are usually placed into use in the customary sequence, but can be provided in those installations where it may be desired to use targets in any number of different sequences.

As the rotation of the bin 34a proceeds and its aft end drops into the airstream, the folded target 36a is caused to drop clear due to its own weight, being momentarily suspended by the cord 39a and the attached tapes 37a and connecting ring 38a. The cord 39 pulls clear of the clips 41b and starts unwinding from the coil 77, of which it is a part. Inasmuch as the other end of the cord is connected by the clevis 72a to the bridle 69a, when the coil is completely unwound and the target has fallen astern of the airplane to approximately its maximum towed distance therefrom, the pull is transferred directly to the bridle 69a which is caused to move rearwardly along the release mechanism body 56 together with the ring 67a until it is stopped by the extending latch 63. As the bin 36a approaches its fully opened position, the detent 54a trips the actuator of the limit switch 51a into its open position and at about the same time, the actuator of the previously opened limit switch 53a is moved over into its closed position.

After the first target has been riddled and it is desired to extend a new target, the operator moves the master switch 85 over to its position in which it supplies current to the motor reversing line 88, which causes reverse operation of the motor 49a due to the closed condition of the limit switch 53a. As the first bin is rotated back in the counterclockwise direction toward its retracted or initial closed position, the dentent 54a leaves the actuator of the limit switch 51a in its downwardly extending "open" position and as the actuator 54a makes contact with the switch 52a as it passes thereover the solenoid 60 is energized, tripping the release element 63 and jettisoning the first target. Inasmuch as the limit switch 51a thereafter remains open, the switch 87a can remain closed without causing operation of the motor 49a, unless it is desired to close the bin 34a prior to the jettisoning of the first target in which case the switch 87a is opened prior to the reverse movement of the bin, or at least prior to the contact of the detent 54a with the switch 52a.

In a similar manner, each of the three remaining targets can successively be extended into their operative positions in any sequence which the operator desires and in each instance as soon as the selected bin has started its opening movement, momentary contact of the detent 54 with the switch 52 actuates the solenoid 60 and the trip element 63 to jettison the previously used target. An emergency push-button type switch 89 in a line 89a is provided in the control box 83 to manually energize the solenoid 60 at any time the operator may desire, such as in the event of an emergency and also after the last target has been riddled and it is desired to jettison the same. In a modified form of the control box which has just been described, there may preferably include an indicator panel similar to that shown in Figure 13 at 123, the panel in this figure, however, being used in conjunction with the "flag" type target container shown in Figure 14, about to be described.

Figure 16:
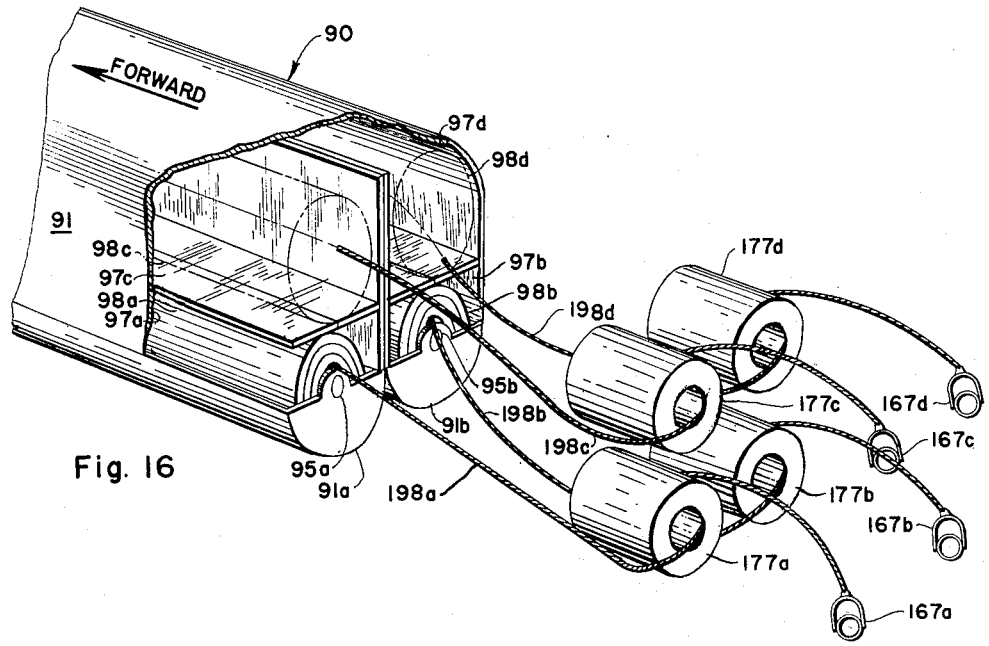
Figure 16 is a perspective view of a modified tow target container for flag type tow targets.

A modified form of tow target container is shown in the perspective view in Figure 14, this streamlined container being adapted for housing a plurality of "flag" type targets which are also releasable by gravity after the towing airplane has taken off from the ground. This flag type container 90 is comprised of a central body portion 91 in which the rolled-up flag type targets are housed prior to their release, as well as the coils of cord for the respective targets as more particularly shown in Figure 16; an after rounded body portion 92 housing the solenoid and release mechanism similar to that previously described for the sleeve type target container; and a rounded nose portion 93. The upper portion of the container 90 is provided with a pair of eyes or shackle adaptors 90a which may be attached to the standard bomb rack suspended from the towing airplane.

The central portion 91 of the container 90 is provided with a pair of laterally disposed part-cylindrical doors 91a and 91b pivotally mounted for rotation upon the parallel fore and aft axes of the pivots 95a and 95b. The container 90 is divided into two pairs of laterally disposed superimposed compartments 97a, 97b, 97c and 97d which are divided through the central portion by the fore and aft vertical partition 96. The doors 91a and 91b each control their respective pair of superimposed compartments 97a—97c and 97b—97d, and these doors are actuated respectively by the electric motors 94a and 94b, as more particularly shown in Figures 15 and 19. Folded flag type targets 98a, 98b, 98c and 98d are stowed within the respective compartments 97a, 97b, 97c and 97d, and have attached thereto the towing cords 188a, 188b, 188c and 188d to the coiled spools 177a, 177b, 177c and 177d, respectively. These towing cords continue through the other ends of the respective coils and are attached to the respective ring adapters 167a, 167b, 167c and 167d, which are adapted to be slid along the release mechanism 142 for selective engagement or release by the trip element 145. This release mechanism is actuated by a solenoid and its details may be identical with those described in conjunction with Figures 5 to 8 inclusive, as used in the "sleeve" type target installation.

Figure 17:
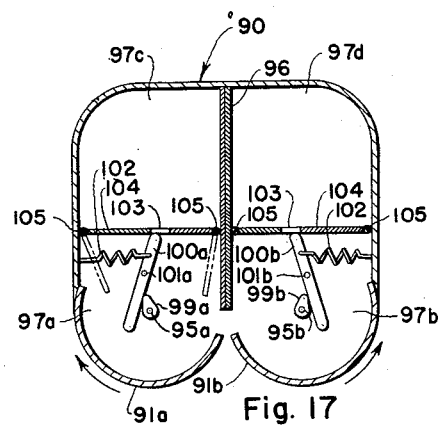
Figure 17 is a sectional view of the doors of the same target container showing the door actuating mechanism.

Referring now to Figure 17, it will be noted that the semi-cylindrical doors 91a and 91b are oppositely rotatable about the pivot mountings 95a and 95b in the directions indicated by the arrows in this figure, and are driven by the above mentioned motors 94a and 94b through reduction gearing within the housing 94g directly connected to the motor casing. Cams 99a and 99b are mounted upon the pivots 95a and 95b for engagement with the levers 100a and 100b which are respectively pivoted at 101a and 101b. These levers are biased by the tension springs 102 in such manner that their lower portions are maintained in engagement with the aforementioned cams and their upper ends are held adjacent the slots 103 in the trap doors 104 which separate the compartments horizontally. The doors 104 are hinged at their outer edges at 105 adjacent the outer walls of the container, and against the intermediate dividing partition 96, and are arranged such that one door will support the other door as long as it is supported by the respective lever 100a or 100b. But at such time as the cams may rotate either of these levers into the position in which the upper end passes beneath the slot 103 both halves of the doors are permitted to fall downwardly about their hinges 105 under the weight of the target carried thereby in each of the upper compartments.

It will, accordingly, be seen that in the case of the target compartments 97a and 97c, for example, clockwise rotation of the actuating motor 94a will impart similar rotation to the pivot 95a and to the attached cam 99a permitting the target 98a within that compartment to fall clear of the central portion 91 of the container 90 and to be towed from the aircraft by its cord or cable 198a in substantially the same manner as the corresponding sleeve type target previously described. Continued rotation of the cam 99a imparts clockwise rotation to the lever 100a about its pivot 101a, and against the tension of the spring 102, causing the upper end of the lever to pass under the slot 103 permitting the doors to fall under the weight of the target 98c which then is dropped into the lower compartment 97a for subsequent release and towing. The operation of the door 91b on the opposite side of the container is opposite in direction but substantially the same as that which has just been described.

Figure 18:
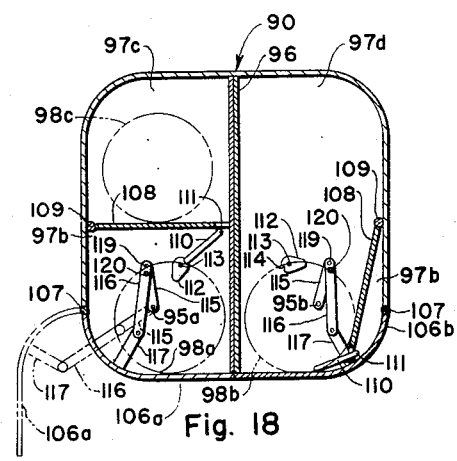
Figure 18 is a modified form of such door actuating mechanism.

In Figure 18, there is shown a further modification of the doors of the tow target container 90 which is provided with outwardly opening hinged doors 106a and 106b of a laterally outwardly moving clam shell type, being hinged at 107. The container in this modification is similarly divided into four compartments 97a, 97b, 97c and 97d, being divided vertically by the intermediate wall 96 and horizontally by the hinged doors 108, which are hinged only at their outer edges at 109 to the outer walls of the container. Motor driven pivots 95a and 95b are provided in each of the lower compartments and have attached thereto the pivot arms 115 pivoted to the idler links 116 by the pivots 119, the link 120 in turn being pivotally connected to the arm 117, one of which is rigidly attached to each of the doors 106a and 106b. The door 108 is held in its horizontal position as shown in the left side of Figure 18, in which it supports the weight of the target 98c in the upper compartment 97c, by means of the prop element 110 which is pivotally connected at 111 to the edge of the door adjacent the central wall 96. The lower end of the element 110 is retained within a detent portion 114 of the cam 112 which is pivotally mounted at 113.

It will, accordingly, be seen that counterclockwise rotation of the motor driven shaft 95a imparts similar rotation to the arm 115 and pushes downwardly and outwardly on the idler link 116 and the door arm 117 causing the door 106a to assume the open position as shown by the construction lines in Figure 18. As the counterclockwise rotation of the shaft 95a continues, the idler link 116 and the door arm 107 are drawn upwardly and inwardly such that the door 106a is again closed. This continued rotation of the shaft 95a and the attached arm 115 and link 116, causes the pin 120 carried by the link 116 to engage and rotate the cam 112 about its pivot 113 such that the prop element 110 is removed from the cam detent 114 and the door 108 is permitted to drop about its hinge 109 under the influence of the weight of the target 98c in the upper compartment. After this door has dropped, it assumes a position similar to that shown for the corresponding door in the right hand side of Figure 18.

Figure 19:
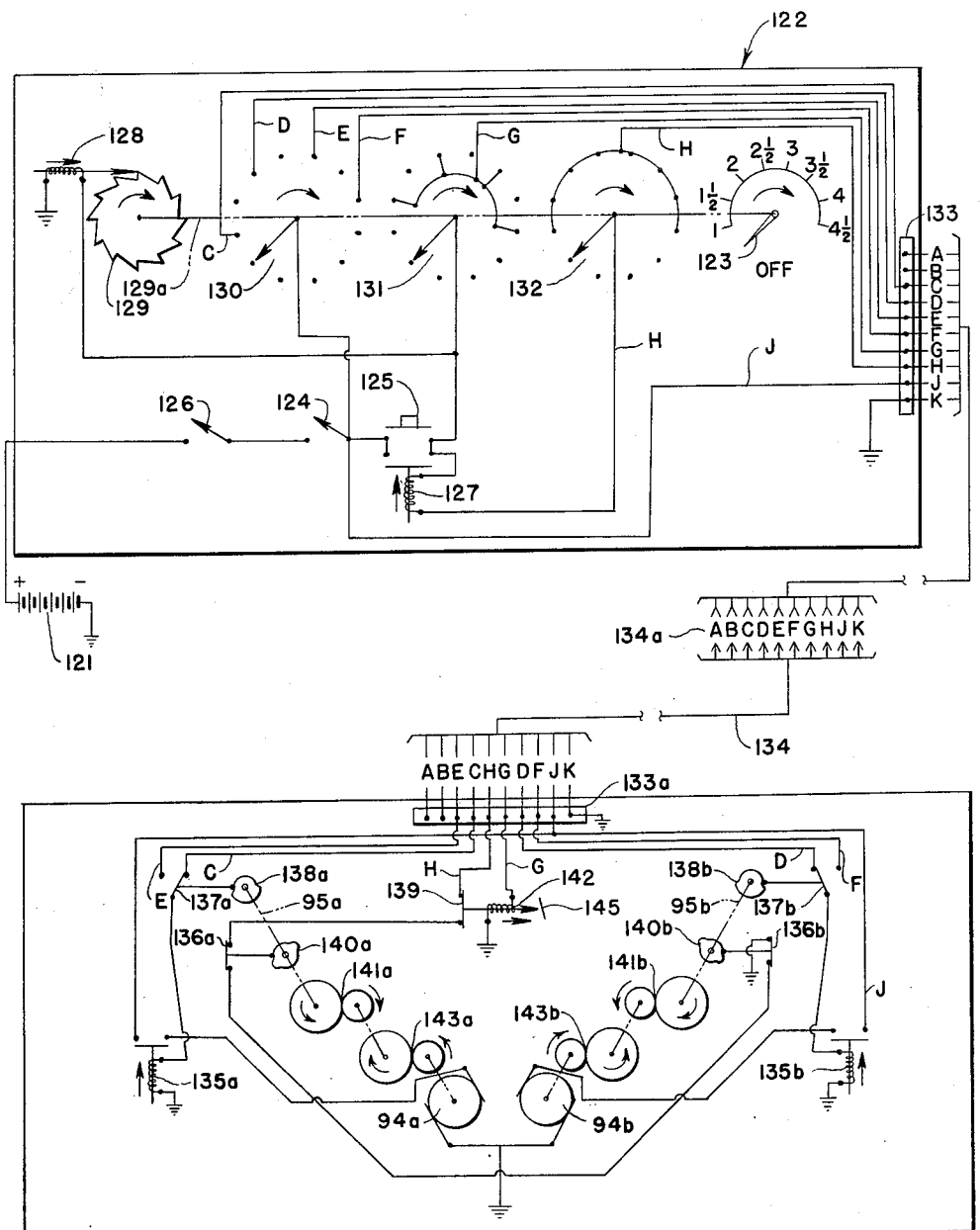
Figure 19 is a wiring diagram for the operation of the flag type target container.

The electrical wiring diagram for the actuation of the container doors of the modification shown in Figures 17 and 18, is shown in Figure 19. In this figure the wiring at the upper portion of the diagram is supplied with electrical power from a battery or other suitable power source 121 and is housed within the control box 122 disposed within the cockpit of the airplane at a position convenient to the pilot, or to the operator. The wiring which is shown at the lower portion of Figure 19 is housed within the central portion of the multiple target container 90 and the two portions are interconnected by the multiple conductor 134 and the readily disconnectable plug 134a. The control box 122 houses a master toggle switch 124, the indicator 123, the manually actuable control push-button switch 125 and the circuit breaker 126, which protects all of the equipment within the control box 122. In addition, there is housed within this control box an interlocking or holding relay 127, which cooperates with the control button 125, for the actuation of the stepping units comprising the step solenoid 128 and the ratchet wheel 129, mounted upon the gang switch shaft 129a, upon which is also mounted the door control switch 130, the release control switch 131, and the interlock control switch 132, as well as the aforementioned indicator 123. An external view of the control box 122 was shown and described in conjunction with Figure 13 on the outer face of which is visible the indicating panel 123, and there is accessibly mounted on the same surface of the control box, the master toggle switch 124, the control push-button 125 and the emergency trip push-button for the circuit breaker 126.

With respect to the equipment and wiring within the target container 90, the numeral 94a indicates the motor for the left-hand compartment as shown in Figure 15, which drives the shaft 95a through the reduction gearing 141a and 143a. The reduction gearing 143a operates the shaft which turns as a unit with the lower left door 91a and the release cam 99a for the upper left compartment doors 104 in Figure 17. Through the reduction gearing 141 the cams 140a and 138a are operated at one half the speed of the semi-circular door 91a. A release mechanism 142 includes a solenoid 144 for actuation of the latch 145 as previously described in connection with Figures 6 and 7. The motor 94b, gearing 141b and the associated mechanism on the right side of the container works similarly and in sequence.

With the master switch 124 and the tow target carrier switch or circuit breaker 126, in their closed positions, the electrical system will operate as follows to release the first target. The push-button switch 125 will energize the solenoid 128 to advance the ratchet wheel 129 one notch and to thereby move the connected gang switch through the intermediacy of the shaft 129a to the position indicated as No. 1 by the indicator needle of the scale 123. Arrival of the gang switch at position No. 1, closes the holding circuit H, due to the closing of the gang switch element 132, and the holding relay 127 which is included in the holding circuit. This serves to maintain the solenoid 128 energized so that accidental or premature further operation of the push-button 125 will not advance the ratchet 129 or the gang switch at this time. The arrival of the switch portion 130 of the gang switch at position No. 1 also energizes the circuit C containing the motor control relay 135a, which thereupon operates to close the circuit J of the motor 94a on the left side of the container unit. The motor 94a thereupon operates the lower left door through one complete revolution, dropping the first target 98a after about one half of this revolution; and toward the completion of the revolution the cam 99a engages the lever 100a tripping the upper door prop so that the upper target 98c drops into the lower compartment. During this complete revolution of the lower door 91a, the cams 138a and 140a are rotated through one half of a revolution. Toward the end of this one half revolution, the cam 140a opens the holding circuit H at the switch 136a, thereby readying the solenoid 128 for subsequent operation. At the end of the first half revolution of the cam 138a, the latter moves the selector switch 137a, opening the circuit C such that operation of the motor 94a ceases and closes the circuit E to thereby condition the same for subsequent closing of this circuit by the gang switch.

In order to jettison the first target 98a which has been dropped in accordance with the foregoing description, the following operation of the mechanism occurs. The second closing of the push-button switch 125 will immediately re-establish the holding circuit H and will also energize the solenoid 128 so that the ratchet 129 through its attached shaft 129a advances the gang switch to position No. 1½. This serves to energize the release solenoid 142 which causes release of the bridle of the cable of the first target by the action of the release mechanism and the trip 145. This also serves to open the holding circuit H thereby conditioning the solenoid 128 for a subsequent operation. In order to release the second target 98b, from the lower right compartment, the operation is similar to that described above in connection with release of the first target except that the gang switch will then be at position No. 2 and the circuit D will be energized instead of circuit C, in such manner that the right hand elements in the lower part of Figure 19 will be operated instead of the left hand elements as in the release of the first target.

Similarly, subsequent closing of the push-button switch 125 which serves to move the gang switch successfully to positions Nos. 2½, 3½, 4½ are substantially repetitions of the above described operation to jettison the first dropped target, and the intermediate operations to release the third and fourth targets are substantially repetitions of the operation to release the first and second targets with the exception that the circuits E and F are used instead of the above described circuits C and D. The selector switch 136a is of a snap-action type which holds the circuit C closed until the switch snaps over to the position in which the circuit E is closed at this point in the circuit. This maintains the relay 135 closed, to continue the operation of the motor 94a, while the selector switch 137a operated by the cam 138a is shifting. It will, of course, be understood that the mechanism and wiring in the right half of the target container 90 is identical with that in the left side except that it is symmetrically disposed; and that its operation is substantially the same except that it does not operate simultaneously, but in the proper sequence as determined by the gang switch arrangement mounted upon the shaft 129a and comprising the gang switches 130, 131, and 132, and as shown on the indicator dial 123. It will likewise be understood that the doors shown in Figure 18 may also be actuated by an electrical system similar to that shown and described in connection with Figure 19.

Other forms and modifications of the present invention, both with respect to their general arrangement and the details of the respective parts, are intended to come within the scope and spirit of the present invention, as more particularly defined in the appended claims.

We claim:

1. A multiple tow target container comprising a streamlined body portion, a plurality of laterally disposed tiltable compartments within said body, a compartment in the aft portion of said container for housing coils of cord therein and a remotely controlled releasing device disposed at the extreme aft portion of said container.

2. A multiple tow target container for aircraft including a streamlined body portion having an opening through the bottom thereof, means carried by the top portion of said container for attachment to an aircraft, a plurality of tiltable compartments laterally disposed adjacent the opening in the bottom portion of said container adapted for the housing of folded targets therein, and means for selectively tilting said compartments for release of the folded targets through said opening for towing from said container.

3. A multiple tow target container for aircraft including a streamlined body portion, means carried by the top portion of said container for attachment to an aircraft, a plurality of tiltable compartments laterally disposed adjacent the bottom portion of said container adapted for the housing of folded targets therein, means for selectively tilting said compartments for release of the folded target therein for towing from said container and means carried by the trailing portion of said container for selectively jettisoning said targets from the trailing portion of said container.

4. In a multiple tow target installation for aircraft, a container having a plurality of compartments for the storage of folded tow targets therein, said compartments being pivotally mounted upon said container for rotational movements whereby the contained folded targets are dropped into the airstream, means for rotating said compartments about said pivots and limit means cooperatively associated with said container and said compartments for discontinuing further rotation of said compartment rotating means.

5. In a tow target container adapted for use in aircraft, a compartment within said container for the housing of a folded target therein, a towing and jettisoning device attached to the trailing portion of said container, power means for moving said compartments into a position in which the tow target is dropped therefrom into the airstream, and automatic means initiated by movement of said container into said dropping position of said target whereby said jettisoning device is actuated to clear the same of a previously used target.

6. In aircraft, a tow target installation consisting of a multiple compartment target container, separately pivoted doors at the bottom of said container disposed under laterally disposed vertical compartments, trippable door means horizontally extending across each of said compartments dividing the same into upper and lower compartments each adapted to house a tow target, power means for the rotation of said lower door for the release of the tow target therefrom and means associated with said lower door for the automatic opening of said upper door when said lower door again is rotated into its closed position for the automatic dropping of the upper target into said lower compartment.

7. An aircraft tow target carrier comprising an elongated streamlined container having a tapering rearward end, means within the forward part of said carrier for carrying a plurality of tow targets in their inoperative stowed condition, means in said carrier rearward of said first named means for storing coils of towing cords for said respective tow targets and means projecting from said tapering rearward end of said carrier for selectively towing and jettisoning said tow targets in their operative extended condition.

8. A tow target releasing device for an aircraft comprising a rearwardly extending tubular member having its forward portion supported from the aircraft and having an opening through its trailing portion, a hook element pivotally mounted upon said member such that an extended portion normally projecting beyond said tubular member may be rotated into said opening within the end of said tubular member, a ring member slidable along said tubular member and having a releasable tow target attached thereto, means for retaining said hook element in its operative position in which it prevents further axial movement rearwardly of said target-attached ring element in the towed condition of said target and further means for selectively tripping said hook element for the jettisoning of said target from said airplane.

9. A multiple tow target container for aircraft including a streamlined body portion having openings through the bottom thereof, means carried by the top portion of said container for attachment to an aircraft, a plurality of tiltable compartments laterally disposed adjacent the openings in the bottom portion of said container adapted for the housing of folded targets therein, means for selectively tilting said compartments for release of the folded target therein through one of said openings for towing from said container, a compartment in the aft portion of said container for the storage of flexible towing means therein for the respective folded targets, a towing hook carried by the trailing portion of said container, portions of said flexible towing means interconnecting each said folded target with the towing means housed within said aft compartment and with said towing hook whereby as each said folded target is released into the airstream the towing means may be unwound through one of the openings in the bottom of said container and to be retained by said towing hook when said target is completely unfolded at the end of said flexible towing means in its operative position.

10. A multiple tow target container for aircraft including a streamlined body portion having openings through the bottom thereof, means carried by the top portion of said container for attachment to an aircraft, a plurality of tiltable compartments laterally disposed adjacent the bottom portion of said container adapted for the housing of folded targets therein, means for selectively tilting said compartments for release of the folded target therein for towing from said container, a compartment in the aft portion of said container for the storage of flexible towing means therein for the respective folded targets, a towing hook carried by the trailing portion of said container, portions of said flexible towing means interconnecting each said folded target with the towing means housed within said aft compartment and with said towing hook whereby as each said folded target is released into the airstream the towing means may be unwound through one of the openings in the bottom of said container and to be retained by said towing hook when said target is completely unfolded at the end of said flexible towing means in the operative position, and means to selectively trip said towing hook for the jettisoning of said target.

11. In an aircraft tow target installation, a tow target container releasably suspended from the aircraft, including a plurality of compartments formed within said container, a folded tow target housed within each said compartment and remote control means for selectively releasing said folded targets from their respective compartments within said container.

12. A multiple tow target container for aircraft including external supporting means carried by the aircraft, means for releasably suspending said container from said supporting means, a plurality of folded targets housed within said container, remotely controlled means for selectively releasing said targets in a desired sequence from said container and further remotely controlled means for releasing said container from its supporting means.

13. A multiple tow target container assembly of the aircraft type including means for supporting the container upon the aircraft, a plurality of separately openable compartments within said container, tow targets housed within each of said container compartments and remote control means for selectively opening said compartments for releasing each said tow target from its respective compartment within said container for towing from the aircraft.

14. A multiple tow target container including attachment means for supporting the container from an aircraft, a plurality of compartments formed within said container, targets housed within the compartments of said container, remote control means for selectively releasing said targets from the respective compartments for towing behind said aircraft, and means for selectively jettisoning each said target from its towing connection on said container.

15. A multiple tow target container for aircraft including a target container attached beneath the aircraft within its plane of symmetry, a plurality of compartments formed within said container, targets housed within the compartments of said container, a towing connection at the rear of the container and remotely controlled means for selectively releasing said targets from the compartments of said container for towing from said towing connection.

16. A multiple tow target container including a body portion, a plurality of compartments within said body portion arranged for the housing of folded tow targets therein, further compartments formed within said body portion arranged for housing coils of towing cord therein, each of said folded tow targets attached to a coil of towing cord, an opposite end of each said coil of towing cord releasably attached to the rear of said multiple container and remote control means for selectively releasing each said tow target into its towed position attached to said container by its said towing cord.

17. A multiple tow target container for aircraft including a plurality of compartments within a forward portion of said container arranged for the housing of folded tow targets therein, further compartments formed within a rear portion arranged for housing coils of towing cord therein, each of said folded tow targets attached to a coil of towing cord, an opposite end of each said coil of towing cord releasably attached to the rear of said multiple container and remotely controlled means for selectively releasing said folded tow targets into the airstream.

18. A multiple tow target container including a body portion, a plurality of compartments within said body portion arranged for the housing of folded tow targets therein, further compartments formed within said body portion arranged for housing coils of towing cord therein, each of said folded tow targets attached to a coil of towing cord, an opposite end of each said coil of towing cord releasably attached to said multiple container, electrically controlled means for selectively releasing said folded tow targets into the airstream and remotely controlled means for releasing the end of said coil of towing cord attached to the rear of said container for the jettisoning of its attached tow target from the aircraft.

19. An aircraft target towing device comprising a container adapted to be secured to the underside of an aircraft fuselage within its vertical plane of symmetry, a tiltable compartment formed within the forward portion of said container, a target folded into said tiltable compartment of said container, a coil of towing cord disposed within the rear portion of said container, a first end of said towing cord attached to the container, the opposite end of said cord attached to said folded target, and remotely controlled means for tilting said compartment for the release of said target into the airstream.

20. In an aircraft tow target installation, an airplane having a cockpit, a target container supported from said airplane, a compartment within said container, a target housed within said compartment, a towing line attached to said target and to an aft portion of said container, means controllable from said cockpit for releasing said target from the compartment in said container for towing from an aft portion of said container and further means controllable from said cockpit for releasing said towing line from the aft portion of said container.

21. In a tow target installation, an airplane having a cockpit, a container supported from the airplane, a target housed within said container, towing means attached to said target and releasably fastened to said container, means including an electric motor controllable from said cockpit for discharging said target from said container for towing therefrom, and means including a solenoid operable from said cockpit for releasing said towing means and said target from said container.

22. In an aircraft tow target installation, a tow target container supported from the aircraft, a plurality of compartments formed within said container, a folded tow target housed within each said compartment, remotely controlled power means for selectively discharging said folded targets from their respective compartments within said container into the airstream in any desired sequence for towing from an aft portion of said container and electric means initiated by the said discharge of a target arranged to automatically release a previously towed target from said container aft portion.

23. An aircraft target towing device comprising a container adapted to be secured to the underside of an aircraft fuselage in alignment with its vertical plane of symmetry, a folded target disposed within a movable portion of said container, flexible towing means disposed within a further portion of said container, a terminal of said flexible towing means attached to said folded target, a solenoid-actuated towing connection carried by said container, a further terminal of said flexible towing means attached to said towing connection, motor means for actuating said movable container portion for extending said target into the airstream to its towing position, and remote controlled electric means arranged for actuating said motor means and said towing connection for the extension and release of said target.

24. A tow target installation for aircraft including a container attached to the underside of an aircraft in alignment with its longitudinal vertical plane of symmetry, a target disposed within said container, towing means for said target disposed within said container, said towing means attached to said target and to an aft portion of said container, means for ejecting said target into the airstream for towing by said towing means from said aft portion of the container, means for releasing said towing means from said aft portion of the container, means for releasing said container from the aircraft during flight and automatic means initiated by the subsequent actuation of said target ejecting means for releasing the prior towed target.

25. In a multiple tow target installation for aircraft, a container supported from the aircraft, a plurality of pivotally mounted compartments within said container, a releasable towing connection carried by an aft portion of said container, a target carried within each of said compartments, power means for rotating one of said compartments for dropping its target into the airstream for towing from said connection, remotely controlled means for tripping said towing connection for the release of a target therefrom, and automatic means actuated by rotation of a further compartment for dropping a subsequent target operative to trip said towing connection for the release of the previously towed target.

26. In a multiple tow target installation for aircraft, a container supported from the aircraft, a plurality of pivotally mounted compartments within said container, a releasable towing connection carried by an aft portion of said container, a target carried within each of said compartments, towing means separately interconnecting each said target with said towing connection, power means for rotating each said compartment for dropping its respective target into the airstream for towing from said connection, control means including a selector switch for selectively actuating said power means for rotating said compartments to drop said targets in any desired sequence, and automatic means initiated by the opening rotation of a compartment for actuating said towing connection release for the jettisoning of a previously towed target.

GEORGE L. WING SHEE.
MORTON I. WEINBERG.

REFERENCES CITED

The following references are of record in the file of this patent:

UNITED STATES PATENTS

| Number | Name | Date |
| --- | --- | --- |
| 1,262,834 | Norberti | Apr. 16, 1918 |
| 1,971,340 | Foulk | Aug. 28, 1934 |
| 2,071,594 | Trimbach | Feb. 23, 1937 |
| 2,138,970 | Jones | Dec. 6, 1938 |
| 2,183,540 | Campbell | Dec. 19, 1939 |

FOREIGN PATENTS

| Number | Country | Date |
| --- | --- | --- |
| 672,525 | Germany | Mar. 3, 1939 |